United States Patent [19]
Koyama et al.

[11] Patent Number: 5,116,683
[45] Date of Patent: May 26, 1992

[54] MAGNETIC RECORDING MEDIUM CONTAINING A SPECIFIED FERROMAGNETIC POWDER, POLYURETHANE RESIN PREPARED FROM SPECIFIED BRANCHED CHAIN DIOLS AND A FATTY ACID ESTER

[75] Inventors: Noboru Koyama; Setsuko Kawahara; Rieko Ren; Kenji Kumamoto; Noboru Nakajima, all of Hino, Japan

[73] Assignee: Konica Corporation, Tokyo, Japan

[21] Appl. No.: 536,536

[22] Filed: Jun. 12, 1990

[30] Foreign Application Priority Data

Jun. 14, 1989 [JP] Japan ................. 1-149526
Jun. 14, 1989 [JP] Japan ................. 1-149527
Jun. 14, 1989 [JP] Japan ................. 1-149528
Aug. 22, 1989 [JP] Japan ................. 1-216691

[51] Int. Cl.⁵ ............................... G11B 5/00
[52] U.S. Cl. ............................ 428/403; 428/694; 428/695; 428/900; 428/423.1; 428/424.6; 428/425.9
[58] Field of Search ........... 428/694, 695, 900, 423.1, 428/424.6, 403, 425.9

[56] References Cited

U.S. PATENT DOCUMENTS

| | | | |
|---|---|---|---|
| 4,637,959 | 1/1987 | Ninomiya et al. | 428/425.9 |
| 4,701,372 | 10/1987 | Akiyama et al. | 428/323 |
| 4,784,914 | 11/1988 | Matsufuji et al. | 428/418 |
| 4,956,220 | 9/1990 | Sueyoshi et al. | 428/141 |

*Primary Examiner*—Merrell C. Cashion, Jr.
*Assistant Examiner*—Stevan A. Resan
*Attorney, Agent, or Firm*—Jordan B. Bierman

[57] ABSTRACT

There is disclosed a magnetic recording medium having excellent dispersability of ferromagnetic powder and ensuring stable production as well as excellent durability and electromagnetic conversion properties. The recording medium comprises a non-magnetic support and provided thereon at least one magnetic layer containing a ferromagnetic compound, wherein at least one of the magnetic layers contains:

a fatty ester of 0.05 to 2 parts by weight per 100 parts by weight of the magnetic powder and, a binder composed of a urethane resin prepared from isocyanate and polyesterpolyol comprising carboxylic acid and diol represented by the following Formula I:

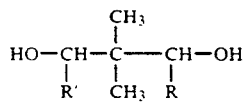

wherein R represents a hydrocarbon group having 1 to 6 carbon atoms; and R' represents a hydrogen atom or a hydrocarbon group having 1 to 6 carbon atoms, provided that the total number of carbon atoms included in R and R' is 3 to 10 and that at least one of R and R' is a branched alkyl group having 3 or more carbon atoms.

14 Claims, No Drawings

MAGNETIC RECORDING MEDIUM CONTAINING A SPECIFIED FERROMAGNETIC POWDER, POLYURETHANE RESIN PREPARED FROM SPECIFIED BRANCHED CHAIN DIOLS AND A FATTY ACID ESTER

FIELD OF THE INVENTION

This invention relates to a magnetic recording medium used in video tape and audio tape, and more particularly to a magnetic recording medium having good dispersibility of ferromagnetic powder and ensuring stable production in addition to excellent running durability and electromagnetic conversion property.

BACKGROUND OF THE INVENTION

Recently, in the field of audio recording, DAT (digital audio tape recorder) has appeared, and in the VTR field, a 8-mm width standard narrower than a conventional ½ inch standard has appeared and is getting more popular. Under such circumstances in the magnetic recording medium, there is demanded increasingly higher density recording as well as a high performance magnetic recording medium of excellent electromagnetic conversion properties and running durability. In order to meet the foregoing demands, fine ferromagnetic powders have come into use for improving the electromagnetic conversion properties of the magnetic recording medium, but the fine ferromagnetic powders do not have good dispersibility in a magnetic coating solution, which results in causing various problems; that is, (1) the electromagnetic conversion properties are liable to be deteriorated; (2) an insufficiently dispersed portion of the ferromagnetic powder is liable to drop off while tape is running; (3) a portion of particles dropping off while running tends to stick to a magnetic head, which causes a temporary output drop; (4) surface smoothness of the magnetic recording medium is impaired, which is liable to cause troubles such as head clogging and edge folding resulting in a deteriorated running durability.

Therefore, there is expected to become available a magnetic recording medium of excellent running durability and electromagnetic conversion properties, which are attributable to excellent dispersibility of the ferromagnetic powder.

Aliphatic dicarboxylic acid such as adipic acid and sebacic acid are conventionally used for a polyesterpolyol component of a urethane resin used as a binder for a magnetic layer. Diols used for the polyesterpolyol component are ethylene glycol, propylene glycol, 1,3-propanediol, 1,4-butanediol 1,5-pentanediol, 1,6-hexanediol, and neopentyl glycol. Aromatic dicarboxylic acid is used to improve rigidity of the urethane resin. It is known to introduce a functional group into the urethane resin with aromatic dicarboxylic acid having a functional group such as metal sulfonate.

However, aromatic dicarboxylic acid is liable to make the urethane resin less soluble, which in turn results in lowering dispersibility of the ferromagnetic powder.

It is possible to increase a density of a functional group in the urethane resin and to decrease a molecular weight thereof in order to improve the solubility and dispersibility thereof.

However, the favorable results will not be able to expect as far as aromatic dicarboxylic acid and conventional glycol are used.

SUMMARY OF THE INVENTION

An object of the present invention is to provide a magnetic recording medium having improved dispersibility of ferromagnetic powder and ensuring stable production as well as excellent running durability and high electromagnetic conversion properties suitable for high density recording.

The above object of the invention can be attained by the magnetic recording medium comprising a non-magnetic support and provided thereon at least one magnetic layer containing a magnetic powder, wherein at least one of the magnetic layers contains a fatty ester of 0.05 to 2 parts by weight per 100 parts by weight of the magnetic powder, and a binder composed of a urethane resin prepared from isocyanate and polyesterpolyol comprising carboxylic acid and diol represented by the following Formula (I):

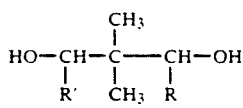

wherein R is a hydrocarbon group having 1 to 6 carbon atoms; R' is a hydrogen atom or a hydrocarbon group having 1 to 6 carbon atoms, provided that the total number of carbon atoms included in R and R' is 3 to 10 and that at least one of R and R' is a branched alkyl group having three or more carbon atoms.

The non-magnetic support and the magnetic layer constituting the magnetic recording medium of the invention are hereunder described.

Non-magnetic Support

The materials for the above support are polyesters such as polyethylene terephthalate and polyethylene-2,6-naphthalate; polyolefins such as polypropylene; cellulose derivatives such as cellulose triacetate and cellulose diacetate; and plastics such as polycarbonate; metals such as Cu, Al and Zn; glass; and various ceramics including the so-called new ceramics such as boron nitride and silicon carbide.

The non-magnetic support is of tape, sheet, card, disc and drum, and various materials can be used by form and application. Further, a form of the support conforms to that of a recorder.

A thickness of the support is usually 3 to 100 μm, preferably 5 to 50 μm in a tape or sheet, and usually 30 to 100 μm in a disc or card.

On a reverse side of the support to the magnetic layer, a back-coating layer may be formed to improve running durability and prevent electrification and transferring.

On the same side of the support as the magnetic layer, an intermediate layer such as a subbing layer may be formed for improving adhesion between the magnetic layer and the support.

Magnetic Layer

In the invention, the magnetic layer comprises a specific magnetic powder, a specific binder and a specific dispersant.

Ferromagnetic Powder

The coercive force (Hc) of the magnetic powder is higher than 650 Oe, preferably 670 to 1000 Oe, and the average particle size is not larger than 0.3 μm, preferably 0.15 to 0.30 μm.

The magnetic powder having the coercive force higher than 650 Oe and the average particle size not larger than 0.3 μm improve dispersibility of the magnetic powder in a magnetic paint and prevent decrease of solubility of the binder and increase of viscosity of the magnetic paint, which can ensure stable production and running stability by enhancing adhesion between the magnetic powder and the binder.

The magnetic powder having a coercive force less than 650 Oe deteriorates the properties of luminance signal. The magnetic powder having the average particle size larger than 0.3 μm tends to roughen the surface of the magnetic layer, which results in increased noise and deterioration of electric characteristics.

The specific surface area of the ferromagnetic powder in terms of BET value is larger than 35 m²/g, preferably 37 to 50 m²/g.

The ferromagnetic powder having the BET value less than 35 m²g decreases the dispersibility thereof in a magnetic paint and causes flocculation thereof.

The magnetic powders used in the invention are iron oxide magnetic powders such as $\gamma$-$Fe_2O_3$, $Fe_3O_4$, Co-adsorbing iron oxide and Co-coating iron oxides; magnetic metal powders containing Fe, Ni and Co as a main component, such as Fe, Ni, Co, Fe-Ni-Co alloy, Fe-Mn-Zn alloy, Fe-Ni-Zn alloy, Fe-Co-Ni-Cr alloy, Fe-Co-Ni-P alloy and Co-Ni alloy; and other magnetic powders such as $CrO_2$, $Fe_4N$ and $BaO$-$6Fe_2O_3$.

Of these, preferable magnetic powders are $\gamma$-$Fe_2O_3$, Co-containing iron oxides and $CrO_2$.

It is preferable to treat the ferromagnetic powder with Al and Si.

The treatment of the ferromagnetic powder with Al and Si can be carried out in the following manner: an aqueous alkali hydroxide solution is added to an aqueous aluminum salt solution in which a magnetic powder is dispersed, to deposit aluminum oxide on the surface of the magnetic powder; washed and filtered Al-containing magnetic powder is dispersed in an aqueous solution dissolving water soluble silicon compound such as water glass, and acid is added to weak acidity to deposit $SiO_2$ on the surface of the magnetic powder, followed by washing, filtration and drying. A deposition amount of Si is 0.1 to 0.7 wt %, preferably about 0.2 to 0.65 wt % of the ferromagnetic powder, and that of Al is 0.01 to 0.2 wt %, preferably about 0.03 to 0.15 wt %.

The form of the ferromagnetic powder is not particularly limited as far as the average particle size and coercive force are within the ranges specified above.

Binder

The specific polyurethane resin is used in the invention in order to improve rigidity of the binder and dispersibility of the magnetic powders.

It is preferable to use together with the specific polyurethane resin, a vinyl chloride resin modified by introducing a functional group.

(1) The specific polyurethane resin

This polyurethane resin is prepared by a condensation reaction of the specific polyesterpolyol with isocyanate.

The specific polyesterpolyol comprises carboxylic acid and diol represented by the following Formula I:

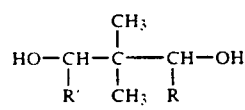

wherein R is a hydrocarbon group having 1 to 6 carbon atoms; and R' is a hydrogen atom or a hydrocarbon group having 1 to 6 carbon atoms, provided that the total number of carbon atoms included in R and R' is 3 to 10 and that at least one of R and R' is a branched alkyl group having three or more carbon atoms.

Examples of diols represented by Formula I

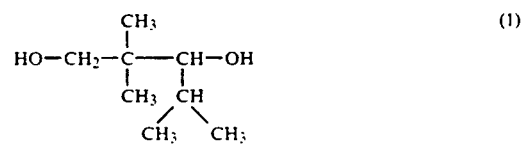
(1)

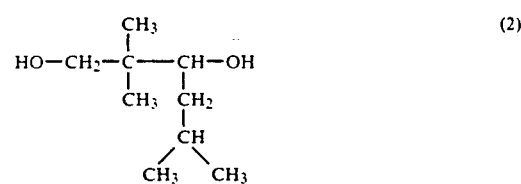
(2)

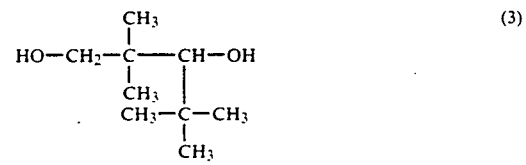
(3)

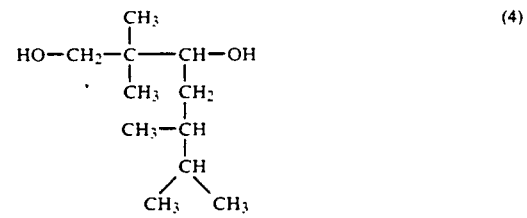
(4)

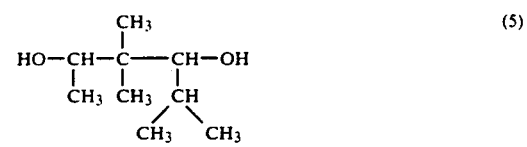
(5)

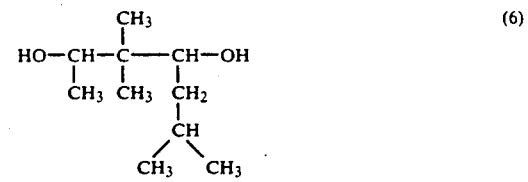
(6)

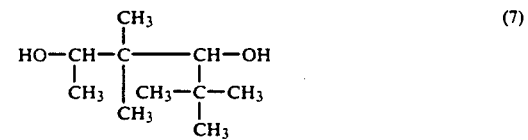
(7)

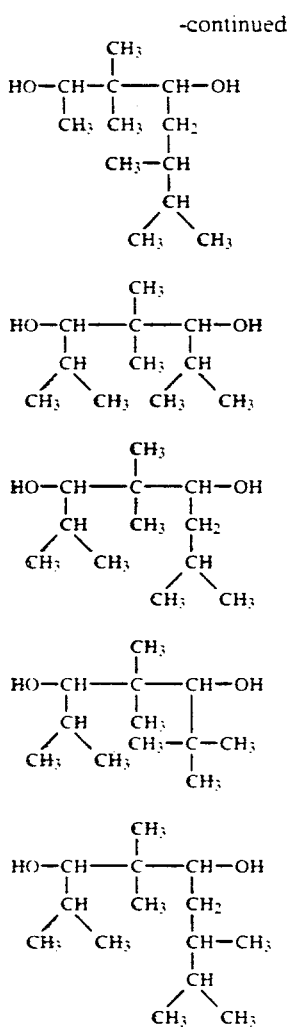

Among them, diols (1) and (2) are particularly favorable. The diols may be used either singly or in combination of two or more.

In the invention, there may be used in combination with the diols represented by Formula I, diols such as ethylene glycol, propylene glycol, 1,3-propanediol, 1,4-butanediol, 1,4-cyclohexane dimethanol, 1,3-cyclohexane dimethanol 1,5-pentanediol, 1,6-hexanediol, neopentyl glycol, diethylene glycol, dipropylene glycol, 2,2,4-trimethyl-1,3-pentanediol, ethylene oxide adduct of bisphenol A, ethylene oxide adduct of hydrogenated bisphenol A, propylene oxide adduct of bisphenol A, propylene oxide adduct of hydrogenated bisphenol A, polyethylene glycol, polypropylene glycol and polytetramethylene glycol; and triols and tetraols such as trimethylolethane, trimethylolpropane, glycerine and pentaerythritol. Among them, 1,4-butanediol, 1,4-cyclohexane dimethanol and 1,3-cyclohexane dimethanol are particularly favorable. These diols may be used solely or in combination of two or more.

Carboxylic acids constituting polyesterpolyol are aromatic dicarboxylic acids such as terephthalic acid, isophthalic acid, orthophthalic acid and 1,5-naphthalic acid; aromatic oxycarboxylic acids such as p-oxybenzoic acid and p-(hydroxyethoxy)benzoic acid; aliphatic dicarboxylic acids such as succinic acid, adipic acid, azelaic acid, sebacic acid and dodecanedicarboxylic acid; and tri- and tetracarboxylic acids such as trimellitic acid, trimesic acid and pyromellitic acid.

These carboxylic acids may be used either singly or in combination of two or more.

In addition thereto, there may be used dicarboxylic acid having a negative functional group.

Examples of the dicarboxylic acids having a negative functional group are 5-sodium sulfoisophthalate, 5-potassium sulfoisophthalate, 2-sodium terephthalate and 2-potassium terephthalate.

Examples of the isocyanates constituting a urethane resin with polyesterpolyols prepared from the above diols and carboxylic acids are 4,4'-diphenylmethane diisocyanate, 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 4,4'-diisocyanate-diphenylether, 1,3-naphthalene diisocyanate, p-xylylene diisocyanate, m-xylylene diisocyanate, 1,3-diisocyanate methylcyclohexane, 1,4-diisocyanate methylcyclohexane, 4,4'-diisocyanate dicyclohexane, 4,4'-diisocyanate dicyclohexylmethane, and isophorone diisocyanate.

In addition to the above isocyanates, there may be used trifunctional isocyanates such as Coronate L made by Nihon Polyurethane Kogyo C. and Desmodur made by Byer AG, and urethane prepolymers having isocyanate groups at the both terminals and conventionally used as a curing agent; and polyisocyanates that are applicable as a curing agent.

Of these isocyanates, 4,4'-diphenylmethane diisocyanate is particularly preferable. Each of the above isocyanates may be used singly or in combination of two or more.

Usually, the isocyanate is used in an amount of 5–80 wt % of the total amount of the binder.

The molecular weight of the urethane resin prepared from dicarboxylic acid and the specific diol represented by Formula I is usually 2,000–70,000. If the molecular weight exceeds 70,000, a viscosity of a magnetic paint becomes higher than an acceptable limit. On the other hand, the molecular weight less than 2,000 may result in forming a non-cured portion having a low molecular weight in a curing step that follows coating of a magnetic paint on a support, which is liable to deteriorate the properties of the coated layer.

A glass transition point of the urethane resin used as the binder in the invention is −10° to 30° C., preferably 0° to 20° C. The urethane resins having the glass transition point in the above range can provide a good calendering property and an excellent durability.

The above urethane resins can be prepared by conventional methods.

(2) The vinyl chloride type resin

In the invention, it is preferred to use in combination with the above specific urethane resin, a specific vinyl chloride type resin having a functional group.

The above specific vinyl chloride type resin includes a modified vinyl chloride type resin and a vinyl chloride type resin prepared by copolymerization of copolymerizable monomers.

Any of the above vinyl chloride type resins have functional groups.

Examples of the above functional groups are negative functional groups such as —SO$_3$M, —OSO$_3$M, —COOM and

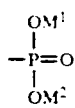

wherein M is a hydrogen, a lithium or sodium atom; $M^1$ and $M^2$ are independently a hydrogen, lithium or sodium atom, or an alkyl group.

Examples of the vinyl chloride type resins, which are to be modified by the above functional groups, are vinyl chloride type copolymers such as vinyl chloride-vinyl acetate copolymer, vinyl chloride-vinyl propionate-vinyl alcohol copolymer, vinyl chloride-vinyl acetate-vinyl maleate-vinyl alcohol copolymer, vinyl chloride-vinyl propionate-vinyl maleate-vinyl alcohol copolymer, and vinyl chloride-vinyl propionate-vinyl maleate-acryl glycydil ether-(2-acrylamide-2-methylpropane potassium)-(allyl-2-hydroxypropyl ether) copolymer.

The above vinyl chloride type copolymers can be prepared by the copolymerization of vinyl chloride monomer, copolymerizable monomer having a functional group, and other copolymerizable monomers according to a specific requirement. Since these copolymers are prepared by vinyl polymerization, they can be easily synthesized, and the properties of the copolymers can be optimized by selecting copolymer components.

The above vinyl chloride type resin can be modified by a dehydrochloride condensation reaction of the vinyl chloride type resin with a compound having a negative functional group and a chlorine atom, such as $Cl-CH_2CH_2SO_3H$, $Cl-CH_2CH_2OSO_3M$, $Cl-CH_2COOM$, or

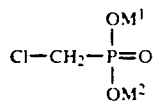

wherein M, $M^1$ and $M^2$ represent the same as those defined above.

The above-mentioned metals that form a salt with sulfonic acid or phosphoric acid are alkali metals (in particular, sodium, potassium and lithium), and potassium is particularly preferable in view of solubility, reactivity and yield.

In preparing the vinyl chloride type resin having the above negative functional group by the copolymerization method, Examples of copolymerizable monomers which have functional groups and copolymerize with vinyl chloride monomers are:

$CH_2=CHSO_3M^1$ $CH_2=CHCH_2SO_3M^1$ $CH_2=C(CH_3)CH_2SO_3M^2$ $CH_2=CHCH_2OCOCH(CH_2COOR^1)SO_3M^1$ $CH_2=CHCH_2OCH_2CH(OH)CH_2SO_3M^1$ $CH_2=C(CH_3)COOC2H4SO_3M^1$ $CH_2=CHCOOC_4H_8SO_3M^1$ $CH_2=CHCONHC(CH_3)2CH_2SO_3M_1$ wherein $M^1$ represents the same as that defined above, and $R^1$ represents an alkyl group having 1 to 20 carbon atoms.

Examples of the copolymerizable monomer having a phosphate are:

$CH_2=CHCH_2OCH_2CH(OH)CH_2-O-PO_3M^4Y^1$ $CH_2=CHCONHC(CH3)_2CH_2-O-PO_3M^4Y^2$

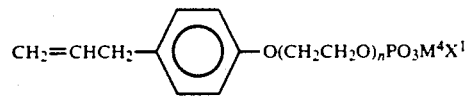

$CH_2=CHCH_2O(CH_2CH_2O)_mPO_3M^4X^2$ wherein $M^4$ represents an alkali metal; $Y^1$ represents a hydrogen atom, $M^4$ or $CH_2=CHCH_2OCH_2CH(OH)CH_2-$; $Y^2$ represents a hydrogen atom, $M^4$ or $CH_2=CHCONHC(CH3)CH_2-$; $X^1$ represents

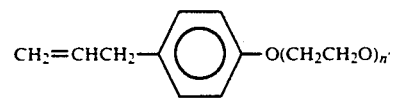

OH or $OM^4$; $X^2$ represents $CH_2=CH-CH_2-O-(CH_2CH_2O)_m-$, OH or $OM^4$; m and n represent independently an integer of 1 to 100.

Examples of the other copolymerizable monomers that are copolymerized with vinyl chloride monomer according to a specific requirement are vinyl esters, vinylidene chloride, acrylonitrile, methacrylonitrile, styrene, acrylic acid, methacrylic acid, acrylates, methacrylates, ethylene, propylene, isobutene, butadiene, isoprene, vinyl ethers, allyl ethers, allyl esters, acrylamide, methacrylamide, maleic acid, and maleates.

Vinyl chloride monomer and copolymerizable monomer having a functional group are polymerized by emulsion polymerization, solution polymerization, suspension polymerization and block polymerization.

The vinyl chloride type resin having the functional group is used in an amount of 30 to 80 wt %, preferably 40 to 60 wt % of the total amount of the binder.

The amount of the vinyl chloride type resin maintained in the above range can contribute to further improving dispersion of the magnetic powder in the magnetic paint in addition to improvement in the dispersion speed.

(3) The amount of the binder

The amount of the binder is usually 1 to 200 parts by weight, preferably 1 to 50 parts by weight per 100 parts by weight of the magnetic powder.

An excessive amount of the binder is liable to dilute the magnetic powder and result ih lowering a recording density of the magnetic recording medium, and too little binder tends to lower strength of the magnetic layer and reduce running durability of the magnetic recording medium.

(4) The fatty acid ester

In the invention, a fatty acid ester is contained in the magnetic layer in an amount of 0.05 to 2 parts by weight per 100 parts by weight of the magnetic powder.

The amount of the fatty acid ester less than 0.05 parts by weight per 100 parts of the magnetic powder is liable to deteriorate the running property and durability. The amount exceeding 2 parts by weight is liable to stain a head of a videodeck and deteriorate the electric characteristics.

The fatty acid ester added in the amount of the above range can improve lubricity of the magnetic layer due to reduction of a friction coefficient. Consequently, the running property and durability of the magnetic recording medium of the invention can be further improved.

It is preferable that a melting point of the fatty acid ester is not higher than 80° C., and the molecular weight (Mn) ranges from 200 to 400.

Examples of the fatty acid esters are, vinyl myristate, propyl myristate, butyl myristate, heptyl myristate, myristyl myristate, vinyl palmitate, propyl palmitate, isopropyl palmitate, butyl palmitate, vinyl stearate, propyl stearate, butyl stearate, amyl stearate, propyl oleate, allyl oleate, butyl oleate, 2-ethylhexyl palmitate, 2-ethylhexyl myristate and 2-ethylhexyl stearate.

Among them, preferable esters are butyl stearate, butyl palmitate, 2-ethylhexyl palmitate, 2-ethylhexyl myristate and 2-ethylhexyl stearate.

(5) The other components

In the invention, there may be added the other conventional additives such as a dispersant, a lubricant, an abrasive and an antistatic agent.

Examples of the dispersant are lecithin, phosphates, amine compounds, alkyl sulfates, fatty amides, and higher alcohols.

An addition amount of the dispersant is usually 1 to 20 parts by weight per 100 parts by weight of the ferromagnetic powder.

Examples of the lubricant are carbon black, graphite, carbon black-graphite polymer, molybdenum disulfide, tungsten disulfide, silicone oil, modified silicon compounds, and fatty acids having 12 to 22 carbon atoms.

Of these lubricants, preferable ones are carbon black, modified silicon compounds and fatty acids. The fatty acid has preferably a melting point lower than 80° C. and an average molecular weight of 200 to 400.

The lubricants are used either singly or in combination of two or more.

An amount of the lubricant added is usually 0.05 to 10 parts by weight, preferably 0.05 to 2 parts by weight per 100 parts by weight of the ferromagnetic powder.

Examples of the abrasive are inorganic powders such as aluminum oxide, titanium oxide, silicon oxide, silicon nitride, chromium oxide and boron carbide; and organic powders such as benzoguanamine resin, melamine resin and phthalocyanine compound.

An average particle size of the abrasive is usually 0.1 to 1.0 μm, preferably 0.2 to 0.5 μm.

An amount of the abrasive added is usually 0.5 to 20 parts by weight per 100 parts by weight of the ferromagnetic powder.

Examples of the antistatic agent are electroconductive powders such as carbon black, graphite and tin oxide-antimony oxide compounds; natural surfactants such as saponin; nonionic surfactants such as alkylene oxide derivatives; cationic surfactants such as higher alkyl amines and quaternary pyridine; anionic surfactants such as sulfates and phosphates; and amphoteric surfactants such as amino acids and aminosulfonic acids.

These surfactants may be used singly or in combination of two or more.

An amount of the surfactant added is usually 0.5 to 20 parts by weight per 100 parts by weight of the ferromagnetic powder.

The above-mentioned lubricant and surfactant do not necessarily have only one function. One compound may serve as both lubricant and surfactant.

Next, the manufacturing method of the magnetic recording medium of the invention is described hereunder.

The manufacturing method

The magnetic recording medium of the invention can be prepared by kneading and dispersing the magnetic layer-forming components such as the ferromagnetic powder and binder in a solvent to obtain a magnetic paint, which is coated on a non-magnetic support and dried.

Examples of the solvent are ketones such as acetone and methyl ethyl ketone; alcohols such as methanol and ethanol; esters such as methyl acetate and ethyl lactate; ethers such as diethylene glycol dimethyl ether and 2-ethoxyethanol; aromatic hydrocarbons such as benzene; and halogenated hydrocarbons such as methylene chloride and, carbon tetrachloride.

The magnetic paint components may be put simultaneously or stepwise into such conventional kneaders as a roll mill and a bowl mill.

The magnetic paint is coated on a non-magnetic support by such conventional methods as gravure roll coating, knife coating, wire bar coating, doctor blade coating, reverse roll coating, dip coating, air knife coating, calender coating, squeeze coating, kiss coating and fountain coating.

The magnetic layer usually has a dry thickness of 1 to 10 μm.

Usually, one magnetic layer is formed on a support, but two layers or more may be formed for high density recording.

Further, a back coating layer may be provided on the opposite side of the support for protecting the support, preventing electrification and improving a running property.

After coating the magnetic paint, a magnetic orientation treatment is carried out according to a specific requirement while the paint is wet. Then, a surface smoothing treatment is usually performed with using a super calender roll.

The magnetic recording medium is prepared by cutting to a desired shape. The magnetic recording medium cut to a tape is used for a video tape or audio tape, and what is cut to a disk is used for a floppy disk. This recording medium can be also used in the form of a card and a cylinder as conventional magnetic recording media.

EXAMPLES

The present invention is hereunder described in more detail by showing the examples of the invention and the comparative examples. The term "parts" means "parts by weight".

Example 1

Preparation of polyester

Into a reaction vessel equipped with a thermometer, a stirrer and a partial reflux condenser were added 679 parts of dimethyl terephthalate, 434 parts of ethylene glycol, 1022 parts of diol (1) represented by Formula (I) (2,2,4-trimethyl-1,3-pentanediol), 0.66 part of zinc acetate and 0.08 part of sodium acetate, and the mixture was heated at 150° to 210° C. for 3 hours to carry out transesterification.

Next, 1212 parts of sebacic acid was added, and the mixture was kept at 210° to 250° C. for 2 hours to proceed with the reaction. Then, the pressure of the reaction vessel was reduced to 20 mmHg over a period of 40 minutes, and condasation polymerization was continued for 60 minutes under a reduced pressure of 5 to 20 mmHg while heating at 240° C. to thereby prepare Polyester 1.

Polyester 1 had a hydroxyl value of 40. The composition of this polyester was identified by analysis such as NMR as follows:

| | |
|---|---|
| Terephthalic acid | 40 mol % |
| Sebacic acid | 60 mol % |
| Ethylene glycol | 44 mol % |
| Trimethylpentane diol | 56 mol % |

Polyester 2 to 4 were prepared in the same manner as in Polyester 1.

The compositions of Polyesters 1 to 4 are shown in Table 1.

Preparation of urethane resin

Into a reaction vessel equipped with a thermometer, a stirrer and a partial reflux condenser were added 1100 parts of toluene, 1100 parts of methyl ethyl ketone, 1000 parts of Polyester 1, 70 parts of diphenylmethane diisocyanate and 1.2 parts of dibutyl tin dilaurate, and the mixture was heated at 70° to 90° C. for 10 hours to prepare Polyurethane Resin 1. Polyurethane Resins 2 through 4 were prepared in the same manner as described above (See Table 1).

Magnetic layer components having the following composition were mixed and dispersed with a bowl mill for 48 hours to prepare the suspensions. Then, 5 parts of Coronate L were added to each of the suspensions to obtain the magnetic paints.

| | |
|---|---|
| Co-containing iron oxide ferromagnetic powder (Hc and average particle size shown in Table 2) | 100 parts |
| α-Al$_2$O$_3$ (average size shown in Table 2) | 5 parts |
| Polyvinyl chloride type resin having metal sulfonrate (tradename: MR110 made by Nippon Zeon Co.) | 8 parts |
| Polyurethane Resin as shown in Table 2 | 7 parts |
| Carbon black | 1 part |
| Myristic acid | 1 part |
| Stearic acid | 1 part |
| Butyl stearate | 0.1 part |
| Cyclohexanone | 100 parts |
| Methyl ethyl ketone | 100 parts |
| Toluene | 100 parts |

Each of the magnetic paints was applied on a 10 μm thick polyethylene terephthalate film base to a dry thickness of 3 μm.

Next, a back coating was applied on the reverse side of the film to a dry thickness of 3 μm.

After removing the solvent by heating, each sample was subjected to surface smoothing treatment with a super calender, and then cut to ½ in. wideth to prepare Video Tape Sample Nos. 1 through 9.

The properties of these video tapes were evaluated in the manners described below. The results are shown in Table 2.

| Electromagnetic conversion properties: | |
|---|---|
| Lumi S/N: | the difference of S/N in 100% white signal was determined on each sample with a noise meter made by Shibasoku Co., in comparison with Sample No. 1 as the standard. |
| Chroma S/N: | there was measured a noise voltage in reproducing a white signal recorded at the maximum recording currency in 4.5 MHz. |
| Young's modulus: | was determined from a ratio of elongation in a tensile test of a sample piece. |
| Friction coefficient: | was measured with a MSC tape running tester made by Yokohama System Co. under the conditions of 3.3 m/sec tape speed and 20 g tape tension. |
| Durability: | there was measured a passing number of a sample tape in running at 40° C. and 80% RH on a HR-S7000 made by Japan Victor Corp. |
| Dropout: | was measured with a VTR dropout counter made by Shibasoku Co. |

TABLE 1

| Composition (mole ratio) | | Polyurethane resin | | | |
|---|---|---|---|---|---|
| | | 1 | 2 | 3 | 4 |
| Acids | Terephthalic acid | 40 | 40 | 40 | 40 |
| | Sebacic acid | 60 | 60 | 60 | 60 |
| Glycols | Ethylene glycol | 44 | 44 | 44 | 44 |
| | 1,4-butanediol | — | — | 56 | — |
| | Neopentyl glycol | — | — | — | 56 |
| | Diol (1) | 56 | — | — | — |
| | Diol (2) | — | 56 | — | — |
| | Hydroxyl value | 40 | 43 | 52 | 31 |
| Polyisocyanate | Diphenylmethane diisocyanate | 10 | 10 | 10 | 10 |

TABLE 2

| Sample No. | Polyurethane resin | Average particle size of α-alumina (μm) | Amount of fatty ester (parts) | Ferromagnetic powder | | Lumi S/N (dB) | Young's modulus (kg/mm$^2$) | Friction coefficient | Running durability (pass) | Dropout |
|---|---|---|---|---|---|---|---|---|---|---|
| | | | | Coercive force (Oe) | Average particle size (μm) | | | | | |
| 1 (Invention) | 1 | 0.4 | 0.1 | 680 | 0.30 | +2.1 | 650 | 0.16 | >200 | 4 |
| 2 (Invention) | 1 | 0.2 | 1.0 | 820 | 0.29 | +3.5 | 660 | 0.16 | >200 | 3 |
| 3 (Invention) | 2 | 0.4 | 0.05 | 650 | 0.28 | +2.0 | 620 | 0.18 | >200 | 7 |
| 4 (Invention) | 2 | 0.3 | 2.0 | 750 | 0.28 | +2.8 | 630 | 0.17 | >200 | 7 |
| 5 (Invention) | 1 | 0.4 | 0.4 | 700 | 0.25 | +2.5 | 650 | 0.17 | >200 | 2 |

TABLE 2-continued

| Sample No. | Polyurethane resin | Average particle size of α-alumina (μm) | Amount of fatty ester (parts) | Ferromagnetic powder Coercive force (Oe) | Ferromagnetic powder Average particle size (μm) | Lumi S/N (dB) | Young's modulus (kg/mm²) | Friction coefficient | Running durability (pass) | Dropout |
|---|---|---|---|---|---|---|---|---|---|---|
| 6 (Comparison) | 1 | 0.4 | 0.04 | 700 | 0.35 | −1.5 | 700 | 0.42 | 6 | 421 |
| 7 (Comparison) | 1 | 0.2 | 2.1 | 700 | 0.28 | −1.8 | 580 | 0.13 | 24 | 9 |
| 8 (Comparison) | 3 | 0.3 | 0.4 | 700 | 0.28 | −0.4 | 450 | 0.22 | 32 | 25 |
| 9 (Comparison) | 4 | 0.5 | 0.4 | 700 | 0.28 | 0 | 520 | 0.24 | 40 | 19 |

Example 2

On a 14 μm thick polyethylene terephthalate support were applied by the wet-on-wet double coating method the magnetic paint used for Sample No. 5 for an upper layer and the magnetic paint B of the following composition for a lower layer in such amounts that the dry thicknesses of the upper and lower layers are 0.5 μm and 2.5 μm, respectively, to prepare Sample No. 10 (invention). The properties were evaluated in the same manner as in Example 1. The results are shown in Table 3.

| Composition of magnetic Paint B (lower layer) | |
|---|---|
| Co-γ-Fe₂O₃ (Hc:680, BET:38) | 100 parts |
| Polyvinyl chloride type resin having negative functional groups | 13 parts |
| Polyester polyurethane resin having negative functional groups | 7 parts |
| Carbon black | 10 parts |
| Myristic acid | 2 parts |
| Stearic acid | 1 part |
| Butyl stearate | 1 part |
| Cyclohexanone | 180 parts |
| Methyl ethyl ketone | 120 parts |
| Toluene | 120 parts |
| Polyisocyanate | 5 parts |

Example 3

Sample No. 11 (invention) was prepared in the same manner as in Example 2, except the magnetic paint C of the following composition was used for the upper layer and the magnetic coating used Sample No. 5 was used for the lower layer. The properties were evaluated in the same manner as in Example 1. The results are shown in Table 3.

| Composition of magnetic paint C (the upper layer) | |
|---|---|
| Co-γ-Fe₂O₃ (Hc:850, BET:50) | 100 parts |
| Polyvinyl chloride type resin | 13 parts |

| Composition of magnetic paint C (the upper layer) | |
|---|---|
| having negative functional groups | |
| Polyester polyurethane resin having negative functional groups | 7 parts |
| α-Al₂O₃ (average particle size: 0.3 μm) | 6 parts |
| Carbon black | 1 parts |
| Myristic acid | 2 parts |
| Stearic acid | 1 part |
| Butyl stearate | 1 part |
| Cyclohexanone | 180 parts |
| Methyl ethyl ketone | 120 parts |
| Toluene | 120 parts |
| Polyisocyanate | 5 parts |

Example 4

Sample No. 12 (comparison) was prepared in the same manner as in Example 2, except that the magnetic paint of Sample No. 5 used for the upper layer was replaced with the magnetic paint of Sample No. 9. The properties were evaluated as shown in Table 3.

Example 5

Sample No.13 (comparison) was prepared in the same manner as in Example 3, except that the magnetic paint of Sample No. 5 used for the lower layer was replaced with the magnetic paint of Sample No. 9. The properties were evaluated as shown in Table 3.

TABLE 3

| Sample No. | Magnetic paint Upper layer | Magnetic paint Lower layer | Electromagnetic conversion property Lumi S/N | Electromagnetic conversion property Chroma S/N |
|---|---|---|---|---|
| 10 (Invention) | Magnetic paint used in Sample No. 5 | Magnetic paint B | +2.1 | +2.4 |
| 11 (Invention) | Magnetic paint C | Magnetic paint used in Sample No. 5 | +2.6 | 2.3 |
| 12 (Comparison) | Magnetic paint used in Sample No. 10 | Magnetic paint B | 0 | 0 |
| 13 (Comparison) | Magnetic paint C | Magnetic paint used in Sample No. 10 | +0.3 | −0.1 |

It is understood from Table 2 that the magnetic recording media of the invention have more, excellent electromagnetic conversion properties, Young's modulus, friction coefficient durability and dropout than those of the comparative samples. Further, as can be seen from Table 3, an improvement in electromagnetic conversion properties was observed in Samples No. 10 and 11 in which the double layers were provided.

Example 6

Polyurethane Resins No. 5 through 10 were prepared in the same manner as in Example 1 except that the components shown in Table 4 were used.

Then, the magnetic paints were prepared by kneading and dispersing the following components in a bowl mill.

| Compositions of the magnetic paints | |
|---|---|
| Co-γ-Fe₂O₃ | 100 parts |
| (Hc and BET shown in Table 5) | |
| α-Al₂O₃ (average particle size: 0.2 μm) | 5 parts |
| Polyvinyl chloride copolymer having potassium sulfonate (MR110, made by Nippon Zeon Co.) | 9 parts |
| Polyurethane Resin as shown in Table 5 | 6 parts |
| Carbon black (average particle size: 40 μm) | 0.5 part |
| Myristic acid | 1 part |
| Stearic acid | 1 part |
| Butyl stearate | 1 part |
| Cyclohexanone | 100 parts |
| Methyl ethyl ketone | 100 parts |
| Toluene | 100 parts |

To each of the magnetic paints were added 5 parts of Coronate L. Then, each paint was coated on a support and dried to prepare Samples No. 14 through 14.

The properties of each sample were evaluated in the same manner as in Example 1. The results are shown in Table 5.

Example 7

Polyurethane Resins No. 11 through 17 were prepared in the same manner as in Example 1 except that the components shown in Table 6 were used.

Then, the magnetic paints were prepared by kneading and dispersing the following components in a bowl mill.

| Compositions of the magnetic paints | |
|---|---|
| Al-Si treated ferromagnetic powders | 100 parts |
| (Hc and BET shown in Table 7) | |
| α-Al₂O₃ average particle size: 0.2 μm | 5 parts |
| Vinyl chloride-vinyl acetate-vinyl alcohol copolymer (VAGH, made by Union Carbide Corp.) | 8 parts |
| Polyurethane Resin as shown in Table 7 | 7 parts |
| Carbon black (average particle size: 40 μm) | 1 part |
| Myristic acid | 1 part |
| Stearic acid | 1 part |
| Butyl stearate | 1 part |
| Cyclohexanone | 100 parts |
| Methyl ethyl ketone | 100 parts |
| Toluene | 100 parts |

To each of the magnetic paints were added 5 parts of Coronate L. Then, each paint was coated on a support and dried to prepare Samples No. 21 through 29.

The properties of each sample were evaluated in the same manner as in Example 1. The results are shown in Table 7.

TABLE 4

| Composition (parts) | | Polyurethane resin | | | | | |
|---|---|---|---|---|---|---|---|
| | | 5 | 6 | 7 | 8 | 9 | 10 |
| Acids | Terephthalic acid | 1350 | 1350 | 1350 | 1230 | — | 1350 |
| | 5-sodium isophthalic acid | — | — | — | 190 | — | — |
| | Adipic acid | — | — | — | — | 820 | — |
| | Azelaic acid | — | — | — | — | 450 | — |
| Glycols | 1,4-cyclohexane dimethanol | 1800 | 1800 | 1800 | 1800 | 1800 | 1800 |
| | Diol (1) | 600 | — | 600 | 600 | — | — |
| | Diol (2) | — | 600 | — | — | — | — |
| | 1,4-butanediol | — | — | — | — | 330 | 330 |
| Isocyanate | 4,4'-diphenylmethane diisocyanate | 2040 | 2040 | — | 2040 | 2040 | 2040 |
| | 2,4-tolylene diisocyanate | — | — | 1400 | — | — | — |
| Molecular weight (Mn) | | 20000 | 18000 | 21000 | 16000 | 60000 | 12000 |
| Glass transition point (°C) | | 50 | 60 | 40 | 55 | −30 | 30 |

TABLE 5

| Sample No. | Co-γ-Fe₂O₃ Hc (Oe) | Co-γ-Fe₂O₃ BET (m²/g) | Polyurethane resin | Lumi S/N (dB) | Young's modulus (kg/mm²) | Running durability (pass) |
|---|---|---|---|---|---|---|
| 14 (Invention) | 700 | 38 | 5 | +2.0 | 700 | 200< |
| 15 (Invention) | 700 | 38 | 6 | +1.8 | 730 | 200< |
| 16 (Invention) | 700 | 38 | 7 | +2.3 | 680 | 200< |
| 17 (Invention) | 700 | 38 | 8 | +2.5 | 720 | 200< |
| 18 (Invention) | 900 | 50 | 8 | +3.0 | 710 | 200< |
| 19 (Comparison) | 700 | 38 | 9 | +0 | 420 | 20 |
| 20 (Comparison) | 700 | 38 | 10 | −0.5 | 550 | 60 |

As apparent from Table 5, the magnetic recording media of the invention have more excellent electromagnetic conversion properties, Young's modulus and durability than those of the comparative samples.

TABLE 6

| Compounds (mole ratio) | | Polyurethane resin | | | | | | |
|---|---|---|---|---|---|---|---|---|
| | | 11 | 12 | 13 | 14 | 15 | 16 | 17 |
| Acids: | Terephthalic acid | 40 | 40 | — | — | 30 | — | 40 |
| | Isophthalic acid | — | — | 40 | — | — | — | — |
| | 1,5-naphthalic acid | — | — | — | 40 | — | — | — |
| | 5-sodium isophthalic acid | — | — | — | — | 10 | — | — |
| | Sebacic acid | 60 | 60 | 60 | 60 | 60 | 60 | 60 |
| | Adipic acid | — | — | — | — | — | 40 | — |

TABLE 6-continued

| Compounds (mole ratio) | | Polyurethane resin | | | | | | |
|---|---|---|---|---|---|---|---|---|
| | | 11 | 12 | 13 | 14 | 15 | 16 | 17 |
| Glycols | Ethylene glycol | 44 | 44 | 44 | 44 | 44 | 44 | 44 |
| | 1,4-butanediol | — | — | — | — | — | 56 | — |
| | Neopentyl glycol | — | — | — | — | — | — | 56 |
| | Diol (1) | 56 | — | 56 | 56 | 56 | — | — |
| | Diol (2) | — | 56 | — | — | — | — | — |
| Hydroxyl value | | 40 | 43 | 38 | 35 | 37 | 52 | 31 |
| Diphenylmethane diisocyanate | | 10 | 10 | 10 | 10 | 10 | 10 | 10 |
| Molecular weight (Mn) | | 20000 | 23000 | 18000 | 15000 | 19000 | 70000 | 16000 |
| Glass transition point (°C.) | | 5 | 0 | 10 | 20 | 0 | −20 | 5 |

TABLE 7

| Sample No. | Ferromagnetic powder | | | Polyurethane resin | Lumi L-SN (dB) | Young's modulus (kg/mm$^2$) | Running durability (pass) |
|---|---|---|---|---|---|---|---|
| | Hc(Oe) | Surface treatment | | | | | |
| | | Compound | wt % | | | | |
| 21 (Invention) | 700 | Al—Si | 0.05/0.25 | 11 | +2.2 | 650 | 200< |
| 22 (Invention) | 700 | Al—Si | 0.05/0.25 | 12 | +2.3 | 620 | 200< |
| 23 (Invention) | 700 | Al—Si | 0.05/0.25 | 13 | +2.0 | 680 | 200< |
| 24 (Invention) | 700 | Al—Si | 0.05/0.25 | 14 | +1.8 | 700 | 200< |
| 25 (Invention) | 700 | Al—Si | 0.05/0.25 | 15 | +2.5 | 640 | 200< |
| 26 (Invention) | 900 | Al—Si | 0.10/0.50 | 15 | +3.1 | 630 | 200< |
| 27 (Comparison) | 700 | Al—Si | 0.05/0.25 | 16 | 0 | 420 | 15 |
| 28 (Comparison) | 700 | Al—Si | 0.05/0.25 | 17 | +0.5 | 530 | 38 |
| 29 (Comparison) | 700 | None | | 16 | +1.0 | 500 | 31 |

What is claimed is:

1. A magnetic recording medium comprising a nonmagnetic support having provided thereon at least one magnetic layer containing a ferromagnetic powder having a coercive force of not less than 650 Oe, an average particle size of not more than 0.3 μm and a BET value of not less than 35 m$^2$/g, wherein at least one magnetic layer contains;
   a fatty acid ester in an amount of 0.05 to 2.0 parts by weight per 100 parts by weight of said ferromagnetic powder,
   a urethane resin prepared from isocyanate and polyesteropolyol comprising a carboxylic acid and a diol represented by the following Formula I, and
   a vinyl chloride resin having a functional group selected from the group consisting of —SO$_3$, —OSO$_3$M, —COOM, and —PO$_3$M$_1$M$_2$, wherein M is hydrogen, lithium, or sodium; and M$_1$ and M$_2$ are each hydrogen, lithium, sodium, or an alkyl;

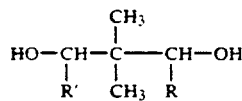

(I)

wherein R represents a hydrocarbon group having 1 to 6 carbon atoms; and R' represents a hydrogen atom or a hydrocarbon group having 1 to 6 carbon atoms, provided that the total number of carbon atoms included in R and R' is 3 to 10 and that at least one of R and R' is a branched alkyl group having 3 or more carbon atoms.

2. The recording medium of claim 1, whrien the hydrocarbon groups represented by R and R' are an alkyl group, a cycloalkyl group and a phenyl group.

3. The recording medium of claim 1, wherein the carboxylic acid is di- or more valent carboxylic acid.

4. The recording medium of claim 3, wherein the carboxylic acid comprises a functional group.

5. The recording medium of claim 1, wherein the carboxylic acid comprises a functional group.

6. The recording medium of claim 5, wherein the functional group is a sulfonic acid group or a salt thereof.

7. The recording medium of claim 1, wherein the polyesterpolyol further comprises other polyols than the diols represented by Formula I.

8. The recording medium of claim 7, wherein the other polyols are 1,4-cyclohexane dimethanol, 1,3-cyclohexane dimethanol and 1,4-butanediol.

9. The recording medium of claim 1, wherein the urethane resin has a molecular weight of 2000 to 70000.

10. The recording medium of claim 9, wherein the urethane resin has a qlass transition point of −10° to 30° C.

11. The recording medium of claim 1, wherein an addition amount of the binder is 1 to 50 parts by weight per 100 parts by weight of the magnetic powder.

12. The recording medium of claim 1, wherein the ferromagnetic powder is treated with Al and Si.

13. The recording medium of claim 12, wherein the deposition amounts of Al and Si are 0.01 to 0.2 wt % and 0.1 to 0.7 wt %, respectively.

14. The recording medium of claim 13, wherein the deposition amounts of Al and Si are 0.03 to 0.15 wt % and 0.2 to 0.65 wt %, respectively.

* * * * *